United States Patent [19]

Becker et al.

[11] Patent Number: 5,084,487

[45] Date of Patent: Jan. 28, 1992

[54] PLASTIC COMPACT OR CELLULAR MOLDINGS BASED ON ELASTOMERS CONTAINING N-SUBSTITUTED UREA AND AMIDE GROUPS IN BOUND FORM, AND POLYAZOMETHINE-CONTAINING POLYOXYALKYLENE-POLYAMINE MIXTURES

[75] Inventors: Johannes Becker, Ludwigshafen; Guenther Matzke, Heidelberg; Hans U. Schmidt, Griesheim; Willibald Schoenleben, Heidelberg, all of Fed. Rep. of Germany

[73] Assignee: BASF Aktiengesellschaft, Ludwigshafen, Fed. Rep. of Germany

[21] Appl. No.: 628,299

[22] Filed: Dec. 17, 1990

[30] Foreign Application Priority Data

Jan. 2, 1990 [DE] Fed. Rep. of Germany ....... 4000014

[51] Int. Cl.$^5$ .............................................. C08G 18/14
[52] U.S. Cl. ..................... 521/159; 521/163; 528/61; 528/64; 528/68; 252/182.23; 264/51; 264/328.1; 264/328.6; 264/328.8
[58] Field of Search ............... 521/159, 163; 528/61, 528/64, 68; 252/182.23; 264/51, 328.1, 328.6, 328.8

[56] References Cited

U.S. PATENT DOCUMENTS 4,506,039 3/1985 Balle et al. .......................... 528/68

Primary Examiner—Maurice J. Welsh
Attorney, Agent, or Firm—William G. Conger

[57] ABSTRACT

The invention relates to a process for the production of elastic, compact or cellular moldings based on elastomers containing N-substituted urea and amide groups in bound form, by reacting a) one or more organic and/or modified organic polyisocyanate with
b) a polyazomethine-containing polyoxyalkylene-polyamine mixture (b) which contains:
  bi) one or more polyoxyalkylene-polyaldimine and/or polyketimine,
  bii) one or more polyoxyalkylene-polyamine containing terminal secondary amino groups, and, if desired,
  biii) one or more polyoxyalkylene-polyamine containing terminal primary amino groups and
c) one or more alkyl-substituted aromatic polyamine having a molecular weight of up to 500, in the presence or absence of
d) catalyst, and, if appropriate,
e) blowing agents,
f) auxiliaries and/or
g) additives, to polyazomethine containing polyoxyalkylene - polyamine mixtures which can be used for this purpose and to the prepared elastomers.

18 Claims, No Drawings

PLASTIC COMPACT OR CELLULAR MOLDINGS BASED ON ELASTOMERS CONTAINING N-SUBSTITUTED UREA AND AMIDE GROUPS IN BOUND FORM, AND POLYAZOMETHINE-CONTAINING POLYOXYALKYLENE-POLYAMINE MIXTURES

The present invention relates to a process for the production of elastic, compact or cellular moldings based on elastomers containing N-substituted urea and amide groups in bound form by reacting organic, unmodified or modified polyisocyanates with a polyazomethine-containing polyoxyalkylene-polyamine mixture which contains one or more polyazomethine, preferably a polyketimine, one or more one polyoxyalkylene-polyamine containing terminal secondary amino groups and, if desired, a polyoxyalkylene-polyamine containing terminal primary amino groups, and low-molecular-weight, alkyl-substituted aromatic polyamines, expediently with the aid of the RIM technique, to novel polyazomethine-containing polyoxyalkylene-polyamine mixtures which can be used for this purpose and to the elastomers prepared from the synthesis components mentioned.

The production of polyamide moldings by activated alkaline lactam polymerization is described in detail, for example, in Kunststoff-Handbuch, Volume VI, Polyamide, Carl Hanser Verlag, Munich, 1966, pages 46 to 49. According to EP-A-0,099,058 (U.S. Pat. No. 4,590,242), low-shrinkage polyamide moldings can be produced by activated alkaline lactam polymerization using the reaction injection molding technique with addition of a selected polymer. The equipment for these processes is complicated and therefore expensive, since the catalyst-containing lactam melt and the activator-containing lactam melt must be mixed vigorously, preferably at above 100° C., and transported into the molds, where they are polymerized at from 130° to 200° C.

This disadvantage can be overcome using the isocyanate polyaddition process, in particular using the RIM technique, in which the starting materials are usually mixed at room temperature and reacted in molds kept at from 40° to 60° C.

A process for the production of cellular or non-cellular, elastic moldings having a closed surface layer of polyurethane-polyurea elastomers by reaction injection molding (RIM) is described, for example, in DE-B 2,622,951 (U.S. Pat. No. 4,218,543). The systems mentioned comprise essentially organic polyisocyanates, polyols, reactive aromatic diamines or polyamines which are substituted in the o-position to the amino group by alkyl groups, and effective catalysts for the reaction between hydroxyl and isocyanate groups. The essential feature here is that the aromatic diamines or polyamines are miscible in any ratio with polyols of molecular weight from 12000 to 1800, the alkyl substituents have from 1 to 3 carbon atoms, with two or more of the alkyl substituents having 2 or 3 carbon atoms, and each of the o-positions to the amino groups being substituted. Systems of this type have initiation times of down to less than one second; the transition from the liquid phase to the solid phase takes place virtually instantaneously, which has the consequence that the liquid reaction mixture virtually solidifies on the walls of the mold.

It is furthermore known that the reactivity of aromatically bound amino groups towards isocyanates can be considerably reduced by means of electron-withdrawing substituents. Examples of aromatic diamines of this type are, according to DE-C-12 16 538 (British Patent 981,935), 3,3'-dichloro-4,4'-diaminodiphenylmethane, 3,3'-dinitro-4,4'-diaminodiphenylmethane and 3,3'-dichloro-4,4'-diaminobiphenyl, the processing of which requires complex and aggravating regulations due to misgivings with respect to an action which is detrimental to health. However, the highly electronegative substituents of these compounds reduce the reactivity of the aromatically bound amino groups so much that curing of the moldings produced by reaction injection molding requires up to 15 minutes and is thus uneconomic.

According to EP-A 026,915, polyurethane-polyurea formulations having somewhat reduced reactivity compared with systems of DE-B 26 22 951 are obtained when the aromatic diamines used are 3,3',5,5'-tetraalkyl-substituted 4,4'-diaminodiphenylmethanes in which the alkyl radicals are identical or different methyl, ethyl, isopropyl, sec.- or tert.-butyl radicals, where one or more of the substituents must be isopropyl or sec.-butyl. The tetraalkyl-substituted diaminodiphenylmethanes described have very good miscibility at room temperature with the polyols in the necessary amounts and have only a slight tendency towards crystallization, or none at all, which means that the formulations are easy to handle under the conditions which are usual for conventional RIM systems. However, it has become apparent that the tetraalkyl-substituted 4,4'-diaminodiphenylmethanes described may be insufficiently reactive for particular applications.

EP-A 069,286 describes polyurethane-polyurea formulations which are somewhat more reactive than those in EP-A 026,915. The aromatic diamines used are trialkyl-substituted meta-phenylenediamines, where two of the alkyl substituents are identical or different linear or branched alkyl radicals having from 1 to 4 carbon atoms, and the 3rd alkyl has from 4 to 12 carbon atoms or is 5- or 6-membered cycloalkyl. The formulations have adequate free-flowing properties even at a relatively high diamine content and produce moldings having high heat distortion resistance with no progressive fall in the shear modulus curves between 100° and 200° C.

These processes all have the disadvantage that the reactivity difference in the addition reaction with isocyanate groups is considerable between the relatively high-molecular weight compounds containing two or more primary hydroxyl groups and the aromatic diamines, in spite of steric hindrance of the amino groups, and can only be overcome by using synergistically active catalyst combinations of tertiary amines and metals salts, for example dibutyltin dilaurate, to accelerate the hydroxyl/isocyanate polyaddition reaction. However, polyurethane-polyurea elastomers prepared using metal salt catalysts depolymerize at above 150° C., and exposure to high temperatures for a relatively long duration can result in complete destruction of the mechanical properties of the material.

The partial or exclusive use of polyoxyalkylene-polyamines having molecular weights of from 1100 to 16000 for preparation of elastic polyurethane-polyurea or polyurea elastomers is also known, for example from EP-A-033,498 (U.S. Pat. No. 4,269,945), EP-A-81,701, EP-A-93,861, (U.S. Pat. No. 4,396,729), EP-A-92,672, EP-A-93,862 (U.S. Pat. No. 4,444,910 and U.S. Pat. No. 4,433,067), EP-A-93,334 and EP-A-93,336.

In EP-A-81,701 mentioned above as an example, relatively high-molecular-weight polyoxyalkylene-polyamines containing amino groups bonded to aliphatic or aromatic radicals can be used. However, aliphatic polyoxyalkylene-polyamines are known to be extremely reactive, which means that the processing of RIM formulations on this basis can result in considerable problems as far as the machinery is concerned, for example due to the short times available for injection and the attendant low material output rate, in particular in the production of large-volume moldings. Polyoxyalkylene-polyamines containing aromatically bound amino groups react somewhat more slowly than aliphatic polyoxyalkylene-polyamines. These compounds have the disadvantage of expensive preparation in multi-step processes and, in particular, relatively high viscosity, for example of greater than 20,000 mPas at 25° C., which can cause considerable problems in the processing of formulations containing reinforcing agents.

Furthermore, U.S. Pat. No. 4,552,945 states that polyamide-polyurea elastomers are prepared by the RIM process by reacting organic polyisocyanates, relatively high-molecular-weight compounds containing two or more reactive hydrogen atoms, and a chain extender combination containing a specific enamine, an aromatic diamine and, if desired, a diol. Formulations of this type have a slower gelling time and enable the filling of larger molds.

Furthermore, EP-B-0,109,605 (U.S. Pat. No. 4,499,038) and EP-B-0,135,867 (U.S. Pat. No. 4,645,630) disclose the reduction of the amino group reactivity of polyoxyalkylene-polyamines for the preparation of microcellular or foamed moldings by converting some of the amino groups into ammonium carbamate groups using carbon dioxide.

Another method of reducing the amine reactivity of relatively high-molecular-weight polyoxyalkylene-polyamines containing terminal primary amino groups and for the preparation of elastomers containing polyamide and polyurea groups in bound form is based on the use of polyazomethines, preferably polyketimines as the relatively high-molecular-weight synthesis component containing two or more reactive hydrogen atoms. Elastomers prepared by this process are described in EP-A-0,284,912 (U.S. Pat. No. 4,789,691), EP-A-0,284,253 and EP-A-0,284,254, the relatively high-molecular-weight compounds containing two or more reactive hydrogen atoms employed in EP-A-0,284,254 being mixtures of polyoxyalkylene-polyols and polyoxyalkylene-polyamines containing primary and/or secondary amino groups. Formulations which, in addition to imino groups, contain both hydroxyl groups and various amino groups as reactive groups have the disadvantage of, in particular, the greatly differing reactivity of the starting materials, which requires extremely difficult catalysis, and the attendant processing problems. In addition to reducing the reactivity, azomethine modification results in an increase in the functionality, since the imine function can react with isocyanates in the enamine form both via the nitrogen to form urea bonds and via the β-carbon to form amide bonds.

EP-A-0,298,359 states that elastomers containing N-alkylurea units or N-alkylurea and urethane units in bound form can be prepared by reacting polyisocyanates with chain extenders and N-alkylpolyoxyalkylene-polyamines having from 2 to 12 carbon atoms in the alkyl. Formulations containing in these components can also be processed to form moldings by the RIM technique. However, they have the disadvantage that the reaction mixtures obtained have only poor flow properties due to the high amine reactivity, which means that the filling of large mold volumes is unsatisfactory, in particular if the mold geometry has a narrow cross-section.

Furthermore, U.S. Pat. Nos. 4,048,105, 4,102,833 and 4,374,210 disclose the use in polyurethane systems of isocyanate-containing prepolymers and quasi-prepolymers having NCO contents of from 9 to 31% by weight prepared using modified or unmodified 4,4'-diphenylmethane diisocyanate.

By selecting suitable relatively high-molecular-weight compounds containing two or more reactive hydrogen atoms, for example polyether- and/or polyester-polyols, polyoxyalkylene-polyamines containing primary and/or secondary amino groups bound to aliphatic or aromatic radicals, or in particular appropriately substituted aromatic primary diamines as chain extenders, and of specific catalysts or catalyst systems, attempts have been made to match the RIM formulations to the given requirements, for example the volume and geometry of the mold. However, this method has the disadvantage that the starting compounds employed affect not only the reactivity of the RIM formulations, but also the mechanical properties of the moldings obtained, which means that moldings having certain spatial geometries and relatively large dimensions can in some cases only be produced with impaired mechanical properties, or not at all, since the reaction mixtures are, for example, not sufficiently free flowing or cannot be introduced into the mold in the amounts required or the moldings obtained have inadequate green strength and cannot therefore be demolded easily after short mold residence times.

It is an object of the present invention to improve the free-flowing properties of the reaction mixture for the production of elastic, compact or cellular moldings without impairing their initial rigidity or mechanical properties. It is a further object that the system composition can be suitably varied to adjust the flow properties of the reaction mixture to match the mold geometry and capacity.

A further object was to improve the elongation at break and the tear propagation strength of the elastomer moldings.

We have found that, surprisingly, this object can be achieved by using a polyazomethine-containing polyoxyalkylene-polyamine mixture as the relatively high-molecular-compound for the formation of the soft segments in the elastomers.

Accordingly, the present invention provides a process for the production of elastic, compact or cellular moldings based on elastomers containing N-substituted urea and amide groups in bound form, by reacting a) one or more organic and/or modified organic polyisocyanate, preferably an aromatic polyisocyanate and/or a modified aromatic polyisocyanate mixture having an NCO content of from 8 to 33.6% by weight, based on the weight of the polyisocyanate mixture, with b) a polyazomethine-containing polyoxyalkylene-polyamine mixture and c) one or more alkyl-substituted aromatic polyamine having a molecular weight of up to 500, in the presence of absence or d) catalysts and, if appropriate, e) blowing agents, f) auxiliaries and/or g) additives, wherein the polyazomethine-containing polyoxyalkylene-polyamine mixture (b) contains or preferably comprises bi) one or more polyazomethine, preferably a polyketimine, bii) one or more polyoxyalkylene-polyamine containing terminal secondary amino groups, and, if desired, biii) one or more polyoxyalkylene-polyamine containing terminal primary amino groups.

The invention furthermore provides specific embodiments of the process according to the invention as claimed in claims 2 to 14, the polyoxyalkylene-polyamine mixture (b) expediently containing selected secondary polyoxyalkylene-polyamines (bii), the ratio between the aldimine and/or preferably ketimine groups and the secondary amino groups (b) being less than 1, and the compact or cellular moldings advantageously being produced by the RIM technique in a closed, temperature-controlled mold.

In addition, the invention provides suitable polyazomethine-containing polyoxyalkylene-polyamine mixtures as claimed in claims 15 to 17 for the production of the moldings by the process according to the invention, and elastic, compact or cellular elastomers containing N-substituted urea groups and amide groups in bound form and prepared by reacting a) one or more organic and/or modified organic polyisocyanate with b) a polyazomethine-containing polyoxyalkylene-polyamine mixture which contains or preferably comprises bi) one or more polyaldimine and/or preferably polyketimine, bii) one or more polyoxyalkylene-polyamine containing terminal secondary amino groups, and, if desired, biii) one or more polyoxyalkylene-polyamine containing terminal primary amino groups, and c) one or more alkyl-substituted aromatic polyamine having a molecular weight of up to 500, in the presence or absence of d) catalysts and, if appropriate e) blowing agents, f) auxiliaries and/or g) additives, with the proviso that the ratio between the aldimine and/or ketimine groups and the secondary amino groups in the polyoxyalkylene-polyamine mixture (b) is less than 1.

The elastic moldings produced according to the invention based on elastomers containing N-substituted urea and amide groups have good rigidity, relatively high elongation at break and improved tear propagation strength. The reaction mixtures for their preparation have improved free-flowing properties and an extended gelling time, which means that the output rates in commercially available high-pressure injection-molding equipment can be considerably increased and even large-volume molds can be filled without problems. It is particularly advantageous that certain flow properties of the reaction mixture can be adjusted in a specific manner by varying the ratio between the aldimine and/or ketimine groups and the secondary amino groups.

These changes in properties could not have been predicted, since the exclusive use of polyoxyalkylene-polyaldimines and/or -polyketimines instead of polyoxyalkylene-polyamines only inadequately improves the flow properties of the reaction mixture and, although the elastomers obtained have good rigidity, the elongation is low. The use of polyoxyalkylene-polyamines containing secondary terminal amino groups instead of those containing primary amino groups gives reaction mixtures with improved flow properties, with the mechanical properties of the resultant elastomers being essentially unchanged.

The following details apply to the starting materials which can be used for the preparation of the elastomers containing N-substituted urea and amide groups in bound form and to the moldings comprising these elastomers.

a) Suitable organic polyisocyanates are conventional aliphatic, cycloaliphatic and, preferably, aromatic polyisocyanates. Specific examples which may be mentioned are: 1,6-hexamethylene diisocyanate, 1-isocyanato-3,5,5-trimethyl-3-isocyanatomethylcyclohexane, 2,4- and 2,6-hexahydrotolylene diisocyanate and the corresponding isomer mixtures, 4,4'-, 2,2'- and 2,4'-dicyclohexylmethane diisocyanate and the corresponding isomer mixtures, mixtures of 4,4'-, 2,2'- and 2,4'-dicyclohexylmethane diisocyanates and polymethylene-polycyclohexylene polyisocyanates, 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'-, and 2,4'-, 2,2'-diphenylmethane diisocyanates and polyphenyl-polymethylene polyisocyanates (crude MDI) and mixtures of crude MDI and tolylene diisocyanates.

Modified polyisocyanates, i.e. products obtained by chemical reaction of the above diisocyanates and/or polyisocyanates, are frequently also used. Examples which may be mentioned are diisocyanates and/or polyisocyanates containing ester, urea, biuret, allophanate and, preferably, carbodiimide, isocyanurate and/or urethane groups. Specific examples are: aromatic polyisocyanates containing urethane groups and having NCO contents of from 33.6 to 8% by weight, preferably from 31 to 21% by weight, for example 4,4'-diphenylmethane diisocyanate or tolylene diisocyanate modified with low-molecular-weight diols, triols, oxyalkylene glycols, or dioxyalkylene glycols, or polyoxyalkylene glycols having molecular weights of up to 800, the following being examples of dioxyalkylene glycols or polyoxyalkylene glycols, which can be employed individually or as mixtures: diethylene glycol, dipropylene glycol, polyoxyethylene glycols, polyoxypropylene glycols and polyoxypropylene-polyoxyethylene glycols. Prepolymers containing NCO groups and having NCO contents of from 25 to 8% by weight, preferably 21 to 14% by weight, are also suitable. Furthermore, liquid polyisocyanates containing carbodiimide groups and/or isocyanurate rings and having NCO contents of from 33.6 to 8% by weight, preferably from 31 to 21% by weight, for example based on 4,4'-, 2,4'- and/or 2,2'-diphenylmethane diisocyanate and/or 2,4- and/or 2,6-tolylene diisocyanate and, preferably, 2,4- and 2,6-tolylene diisocyanate, and the corresponding isomer mixtures, 4,4'-, 2,4'- and 2,2'-diphenylmethane diisocyanates and the corresponding isomer mixtures, for example of 4,4'- and 2,4'-diphenylmethane diisocyanates, crude MDI and mixtures of tolylene diisocyanates and crude MDI, are also suitable.

However, the following are used in particular: (i) carbodiimide- and/or urethane-containing polyisocyanates made from 4,4'-diphenylmethane diisocyanate or a mixture of 4,4'- and 2,4'-diphenylmethane diisocyanates and having an NCO content of from 33.6 to 8% by weight, (ii) NCO-containing prepolymers having an NCO content of from 8 to 25% by weight, based on the prepolymer weight, and prepared by reacting polyoxyalkylene-polyols having a functionality of from 2 to 4 and having a molecular weight of from 600 to 6000 with 4,4'-diphenylmethane diisocyanate or a mixture of 4,4'- and 2,4'-diphenylmethane diisocyanates, and mixtures of (i) and (ii).

As stated above, suitable compounds for the preparation of the NCO-containing prepolymers are polyoxyalkylene-polyols having a functionality of from 2 to 4, preferably of from 2 to 3 and in particular of 3, and having a molecular weight of from 600 to 6000, preferably from 2800 to 4500. Analogous polyoxyalkylene-polyols having molecular weights of from approximately 180 to 8000 are employed for the preparation of polyoxyalkylene-polyamines, the synthesis components (biii) which may also be used for the preparation of the elastomers according to the invention and a suitable starting material for the preparation of the polyazomethines (bi) and the N-substituted polyoxyalkylene-polyamines (bii). Polyoxyalkylene-polyols of this type can be prepared from one or more alkylene oxides having from 2 to 4 carbon atoms in the alkylene radical and an initiator molecule containing from 2 to 4, preferably 2 or 3, reactive hydrogen atoms in bound form, by conventional processes, for example by anionic polymerization using alkali metal hydroxides, such as sodium hydroxide or potassium hydroxide, or alkali metal alcoholates, such as sodium methylate, sodium ethylate, potassium ethylate or potassium isopropylate, as catalysts or by cationic polymerization using Lewis acids, such as antimony pentachloride, boron trifluoride etherate inter alia, or bleaching earth as catalysts.

Examples of suitable alkylene oxides are tetrahydrofuran, 1,3-propylene oxide, 1,2- or 2,3-butylene oxide and, preferably, ethylene oxide and 1,2-propylene oxide. The alkylene oxides may be used individually, one after the other in an alternating manner or as mixtures. Examples of suitable initiator molecules are water, organic dicarboxylic acids, such as succinic acid, adipic acid, phthalic acid and terephthalic acid, aliphatic and aromatic, unsubstituted or N-monosubstituted or N,N- and N,N'-dialkyl-substituted diamines having from 1 to 4 carbon atoms in the alkyl radical, such as unsubstituted or mono- and dialkyl-substituted ethylenediamine, diethylenetriamine, triethylenetetraamine, 1,3-propylenediamine, 1,3- and 1,4-butylenediamine, 1,2-, 1,3-, 1,4-, 1,5- and 1,6-hexamethylene diamine, phenylenediamines, 2,4- and 2,6-tolylenediamine and 4,4'-, 2,4'- and 2,2'-diaminodiphenylmethane.

Furthermore, suitable initiator molecules are alkanolamines, dialkanolamines and/or trialkanolamines, e.g. ethanolamine, diethanolamine, N-methyl- and N-ethylethanolamine, N-methyl- and N-ethyldiethanolamine and triethanolamine, and also ammonia. Polyhydric, in particular dihydric and/or trihydric alcohols, such as ethanediol, propane-1,2-diol, propane-1,3-diol, diethylene glycol, dipropylene glycol, butane-1,4-diol, hexane-1,6-diol, glycerol, trimethylolpropane and pentaerythritol are preferably used.

The polyoxyalkylene-polyols can be used individually or in the form of mixtures for modifying the organic polyisocyanates.

b) The relatively high-molecular-weight compounds containing two or more reactive hydrogen atoms which are used according to the invention for the formation of the soft segments in the elastomers are polyazomethine-containing polyoxyalkylene-polyamine mixtures (b) which contain or preferably comprise bi) one or more polyazomethine, for example a polyaldimine or preferably a polyketimine, bii) one or more polyoxyalkylene-polyamine containing terminal secondary amino groups, and, if desired, biii) one or more polyoxyalkylene-polyamine containing terminal primary amino groups.

bi) For the purposes of the invention, polyazomethines (bi) are products of the reaction of polyoxyalkylene-polyamines having from 2 to 4, preferably from 2 to 3, primary amino groups bonded to aromatic or preferably to aliphatic radicals and having a mean molecular weight of from 1100 to 8000, preferably from 1100 to 5500 and in particular from 1800 to 3500, and one or more organic aldehyde and/or preferably one or more organic ketone.

The preferred polyoxyalkylene-polyamines containing amino groups bonded to aliphatic radicals can be prepared by conventional processes, for example by cyanoalkylating the polyoxyalkylene-polyols described and subsequently hydrogenating the resultant nitrile (U.S. Pat. No. 3,267,050) or by aminating polyoxyalkylene-polyols using ammonia in the presence of hydrogen and catalysts (DE-A-1,215,373).

Suitable polyoxyalkylene-polyamines containing amino groups bonded to aromatic radicals can be prepared, for example, by reacting the above-described polyoxyalkylene-polyols with aromatic polyisocyanates in an NCO:OH ratio of 2 or more and subsequently hydrolyzing the aromatic NCO-containing prepolymers obtained to give polyamines in a manner similar to the processes of DE-A-2,948,419, E-A-3,039,600, EP-A-84,141, EP-A-79,512, EP-A-97,290, EP-A-97,298, EP-A-97,299, EP-A-99,537, EP-A-113,027, EP-A-113,020 or EP-A-15-4,768.

The polyoxyalkylene-polyamines can be used as individual compounds or in the form of mixtures of products having different molecular weights and functionalities. When polyoxyalkylene-polyols having molecular weights of less than 180, for example low-molecular-weight polyoxyethylene glycols, are used as the starting components, it is necessary for the resultant polyoxyalkylene-polyamines to be mixed with relatively high-molecular-weight polyoxyalkylene-polyamines in such an amount that the mean molecular weight is from 1100 to 8000 at a functionality of from 2 to 4. Other polyoxyalkylene-polyamines which can be used are mixtures of polyoxyalkylene-polyols and polyoxyalkylene-polyamines and/or partially aminated polyoxyalkylene-polyols, with the proviso that the reactive end groups are essentially, i.e. expediently to an extent of greater than 95%, in particular to an extent of greater than 98%, amino groups, and the latter are expediently to the extent of 85% or more, preferably to the extent of greater than 90%, primary amino groups.

The other starting component for the preparation of the polyazomethines (bi) is an organic, preferably an aliphatic and/or cycloaliphatic aldehyde and/or in particular an organic, preferably an aliphatic and/or cycloaliphatic ketone or a mixture of the abovementioned compounds. Examples of suitable aldehydes are acetaldehyde, 3-methoxy-, 3-ethoxy-, 3-propoxy-, 3-isopropoxy-, 3-n-butoxy-and 2-ethylhexoxy-2,2-dimethylpropanal, alkyl 2-formylisobutyrates having from 1 to 4 carbon atoms in the alkyl radical, e.g. ethyl 2-formylisobutyrate, 3-(methylcarbonyloxy)- and 3-(isopropylcarbonyloxy)-2,2-dimethylpropanal, (methoxyacetoxy)-2,2-dimethylpropanal, 2-acetoxy-2-methylpropanal and, in particular, methyl 2-formylisobutyrate and 2,2-dimethylpropanal. Examples of aliphatic and-/or preferably cycloaliphatic ketones are acetone, methyl ethyl ketone, diethyl ketone, methyl propyl ketone, methyl isopropyl ketone, methyl n-butyl ketone, diisopropyl ketone, phenyl methyl ketone, preferably methyl isobutyl ketone, methylcyclohexanone and in particular cyclopentanone and cyclohexanone.

For the preparation of the polyazomethines from the group comprising the polyaldimines and preferably the polyketimines, the polyoxyalkylene-polyamines, preferably polyoxyalkylene-diamines and/or triamines are mixed with an excess of one or more aldehyde and/or preferably one or more ketone, preferably in an —NH-2/—CHO— or CO ratio of 1:1 to 5, in particular 1:1.1 to 4, and, after adding a suitable solvent or diluent, e.g. toluene, xylene, benzene, methylene chloride, dichloroethane, cyclohexane, n-hexane or heptane and, if desired, an inorganic or organic acid, e.g. hydrochloric acid, formic acid, benzoic acid or arylsulfonic acid, e.g. p-toluenesulfonic acid, as catalyst, the mixture is expediently heated on a water separator in the presence of a gas which is inert under the reaction conditions until the amount of water which is theoretically expected or, in the case of a partial reaction, which is desired has been separated off. Reaction times of from 1 to 60 hours, preferably from 5 to 40 hours, are usually necessary for this purpose. Processes of this type are described, for example, in Houben-Weyl, Methoden der organischen Chemie, Volume VII/2b, Part II, Georg Thieme Verlag, Stuttgart 1976, 4th Edn., pages 1948 ff.

Purification of the polyazomethines, for example by filtration, is usually not necessary. The polyazomethines can be used directly for the preparation of elastomers according to the invention after removal of the excess aldehyde and/or ketone by distillation and, if the condensation has been carried out in the presence of a solvent or diluent, of the solvent or diluent preferably employed.

Particularly suitable polyazomethines are polyketimines prepared by reacting polyoxyalkylene-polyamines having a functionality of from 2 to 4 and a molecular weight of 180 to 8000, selected from the group comprising the polyoxyethylene-polyamines, polyoxypropylene-polyamines, polyoxytetramethylene-polyamines, polyoxypropylene-polyoxyethylene-polyamines, polyoxytetramethylene-polyoxypropylene-and/or -polyoxyethylene-polyamines, with aliphatic and/or cycloaliphatic ketones selected from the group comprising methyl isobutyl ketone, methylcyclohexanone and preferably cyclohexanone and cyclopentanone, but where the N-substituted urea- and amide-containing elastomers according to the invention are prepared according to the invention using polyoxyalkylene-polyamines or mixtures having a mean molecular weight of from 1100 to 8000, preferably from 1100 to 5500.

bii) The secondary polyoxyalkylene-polyamines (bii) used according to the invention are expediently those having a molecular weight of from 1100 to 8000, preferably of from 1600 to 4500, and having from 2 to 4, preferably 2 or 3, terminal RNH groups, where R is linear or branched alkyl having from 1 to 12 carbon atoms, preferably from 4 to 10 carbon atoms, e.g. methyl, ethyl, n-propyl, isopropyl, n-, sec.- or tert.-butyl, amyl, n-hexyl, 2-ethylhexyl, octyl, 2-ethyloctyl, decyl or dodecyl, cycloalkyl having from 4 to 10 carbon atoms, preferably 5 or 6 carbon atoms, e.g. cyclobutyl, cycloheptyl, cyclooctyl and preferably cyclopentyl or cyclohexyl, benzyl which is substituted on the phenyl by halogen, preferably fluorine or chlorine, by nitro, alkyl or alkoxy having from 1 to 12, preferably 1 to 6, carbon atoms, or preferably by amino or carboxyl, benzyl, alkylphenyl having from 1 to 12, preferably 1 or 2, carbon atoms in the alkyl, and phenyl.

Preference is given to N,N'-dipropyl-, N,N'-dibutyl-, N,N'-dipentyl-, N,N'-dicyclopentyl-, N,N'-dicyclohexyl-, or N,N'-diphenyl-polyoxyalkylene-diamines or the corresponding N,N'N"-tri-substituted polyoxyalkylene-triamines, and in particular N,N'-dibenzylpolyoxyalkylene-diamines having a molecular weight of from 410 to approximately 8000 and N,N'N"-tribenzylpolyoxyalkyleneiamines having a molecular weight of from 710 to approximately 8000, or mixtures of these N-benzyl-polyoxyalkylene-diamines and -triamines, the polyoxyalkylene radicals expediently being selected from the group comprising polyoxyethylene, polyoxypropylene, polyoxytetramethylene, polyoxypropylenepolyoxyethylene, polyoxytetramethylene-polyoxypropylene and/or -polyoxyethylene and preferably polyoxypropylene and polyoxypropylene-polyoxyethylene.

The secondary polyoxyalkylene-polyamines which can be used according to the invention can be prepared, for example, by hydrogenating the above-described polyoxyalkylene-polyaldimines and/or -polyketimines, the polyoxyalkylene-polyaldimines or -polyketimines preferably themselves being prepared using propionaldehyde, butyraldehyde, cyclopentanone, cyclohexanone and in particular benzaldehyde. However, the polyoxyalkylene-polyaldimines or -polyketimines may also be prepared using other linear or branched aliphatic aldehydes or ketones having from 1 to 12, preferably from 4 to 10, carbon atoms, e.g. acetaldehyde, propionaldehyde, isobutyraldehyde, n-valeraldehyde, isovaleraldehyde, n-caproaldehyde or n-heptaldehyde, acetone, methyl ethyl ketone, methyl n-propyl ketone, diethyl ketone, 2-hexanone, 3-hexanone, methyl tert.-butyl ketone, di-n-propyl ketone, diisopropyl ketone, diisobutyl ketone or di-n-amyl ketone, cycloalkanones, having from 4 to 10 carbon atoms, e.g. cyclobutanone, cycloheptanone, cyclooctanone and preferably cyclopentanone and cyclohexanone, and substituted benzaldehydes, e.g. benzaldehyde which is substituted by fluorine and/or chlorine, nitro, alkyl having from 1 to 12 carbon atoms, alkoxy having from 1 to 12 carbon atoms and preferably amino or carboxyl.

The hydrogenation of the polyoxyalkylene-polyaldimines or -polyketimines can be carried out by conventional methods, for example in the presence of catalysts in solution or preferably in the absence of solvents at elevated temperatures under atmospheric pressure or preferably under superatmospheric pressure. In a preferred process, the polyoxyalkylene-polyaldimines or -polyketimines are hydrogenated at from 60° to 200° C., preferably from 100° to 160° C., and under a pressure of from 20 to 500 bar, preferably from 150 to 230 bar, for from 2 to 50 hours, preferably from 5 to 18 hours, in the presence of a Raney nickel in the absence of a solvent. The hydrogenation mixture obtained is subsequently filtered under superatmospheric pressure, and the volatile constituents are removed from the filtrate under reduced pressure at from 100° to 200° C.

The N-substituted polyoxyalkylene-polyamines obtained can be employed directly, without further purification for the preparation of the elastomers according to the invention.

In another preparation method, the polyoxyalkylene-polyols can also be reacted directly with aliphatic or unsubstituted or substituted aromatic primary amines in the presence of catalysts to give N-substituted polyoxyalkylene-polyamines. Examples of primary amines which are suitable for this purpose are methylamine, ethylamine, n- or isopropylamine, sec.- or tert.-butylamine, laurylamine, cyclohexylamine or aniline.

biii) The polyazomethine-containing polyoxyalkylene-polyamine mixtures (b) which can be used according to the invention may contain the above-described polyoxyalkylene-polyamines (biii) containing terminal primary amino groups as an additional synthesis component in addition to the polyoxyalkylene-polyaldimines and/or -polyketimines (bi) and polyoxyalkylene-polyamines containing terminal secondary amino groups (bii) which are essential to the invention, these polyoxyalkylene-polyamines (biii) expediently containing from 2 to 4, preferably 2 or 3, primary amino groups in bound form and having a molecular weight of from 1100 to 8000, preferably from 1600 to 4500.

The polyazomethine-containing polyoxyalkylene-polyamine mixtures (b) which can be used according to the invention advantageously have, in particular, an aldimine and/or ketimine: secondary amino group ratio of less than 1, the mixtures expediently containing in detail, for example:

from 9 to 49%, preferably 9 to 30%, of aldimine and/or ketimine groups,
from 20 to 91%, preferably from 35 to 80%, of terminal secondary amino groups, and
from 0 to 71%, preferably from 0 to 45%, of terminal primary amino groups, the percentages being based on the total number of aldimine groups, ketimine groups, terminal secondary amino groups and terminal primary amino groups in the polyazomethine-containing polyoxyalkylene-polyamine mixture (b), and components (bi) to (biii) each having a mean molecular weight of from 2000 to 3000.

Since the individual synthesis components (bi) to, if present, (biii) have molecular weights of from 1100 to 8000, their mixing ratios may be varied over a broad range, depending on the molecular weight. With the proviso that synthesis components (bi), (bii) and, if present, (biii) each have a mean molecular weight of from 2000 to 3000, the corresponding polyazomethine-containing polyoxyalkylene-polyamine mixtures (b) usually contain or preferably comprise, based on 100 parts by weight:

from 6 to 59 parts by weight, preferably from 6 to 39 parts by weight, of one or more polyazomethine (bi),
from 11 to 94 parts by weight, preferably from 26 to 86 parts by weight, of one or more polyoxyalkylene-polyamine containing terminal secondary amino groups (bii), and
from 0 to 79 parts by weight, preferably from 0 to 55 parts by weight, of one or more polyoxyalkylene-polyamine containing terminal primary amino groups (biii).

Polyazomethine-containing polyoxyalkylene-polyamine mixtures (b) of this type can be obtained, for example, by mixing pre-prepared polyoxyalkylene-polyaldimines and/or polyketimines (bi) with separately prepared polyoxyalkylene-polyamines containing terminal secondary amino groups (bii) and, if desired, polyoxyalkylene-polyamines containing terminal primary amino groups (biii). According to other procedures which are used, the polyoxyalkylene-polyamines employed may be reacted merely with less than the stoichiometric amount of aldehydes and/or ketones, so that only some of the amino groups present are converted into azomethine groups, or the polyazomethines obtained by full or partial reaction of polyoxyalkylene-polyamines with aldehydes or ketones can, on subsequent hydrogenation, be converted partially or essentially quantitatively into the corresponding secondary amines.

(c) The alkyl-substituted aromatic polyamines having molecular weights of up to 500, preferably of from 122 to 400, are expediently primary aromatic diamines which contain, in the ortho-position to the amino groups, one or more alkyl substituent which reduces the reactivity of the amino group through steric hindrance, are liquid at room temperature and are at least partially, but preferably fully miscible with the polyazomethine-containing polyoxyalkylene-polyamine mixtures (b) under the processing conditions. Examples of compounds which have proved successful are alkyl-substituted meta-phenylenediamines of the formulae

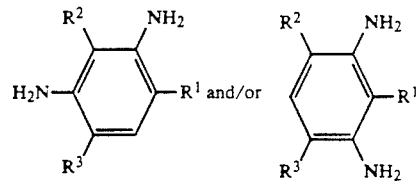

where $R^3$ and $R^2$ are identical or different methyl, ethyl, propyl or isopropyl, and $R^1$ is linear or branched alkyl having from 1 to 10, preferably from 1 to 6, carbon atoms. Branched alkyl $R^1$ having from 4 to 6 carbon atoms in which the branch is on the $C_1$ carbon have also proven successful. Specific examples of $R^1$ radicals are methyl, ethyl, isopropyl, 1-methyloctyl, 2-methyloctyl, 1-methylhexyl, 1,1-dimethylpentyl, 1,3,3-trimethylhexyl, 1-ethylpentyl, 2-ethylpentyl, cyclohexyl, 1-methyl-n-propyl, tert.-butyl, 1-ethyl-n-propyl, 1-methyl-n-butyl and 1,1-dimethyl-n-propyl.

Examples of suitable alkyl-substituted m-phenylenediamines are 2,4-dimethyl-6-cyclohexyl-, 2-cyclohexyl-4,6-diethyl-, 2-cyclohexyl-2,6-diisopropyl-, 2,4-dimethyl-6-(1-ethyl-n-propyl)-, 2,4-dimethyl-6-(1,1-dimethyl-n-propyl)- and 2-(1-methyl-n-butyl)-4,6-dimethyl-phenylene-1,3-diamine. Preference is given to 1-methyl-3,5-diethyl-2,4- and/or -2,6-phenylenediamines, 2,4-dimethyl-6-tert.-butyl-, 2,4-dimethyl-6-isooctyl- and 2,4-dimethyl-6-cyclohexyl-phenylene-1,3-diamine.

3,3'-Di- and/or 3,3',5,5'-tetra-n-alkyl-substituted 4,4'-diaminodiphenylmethanes, e.g. 3,3'-dimethyl-, 3,3'-diethyl-, 3,3'-di-n-propyl-, 3,3',5,5'-tetramethyl-, 3,3',5,5'-tetraethyl- and 3,3',5,5'-tetra-n-propyl-4,4'-diaminodiphenyl methane are also suitable.

Preferred alkyl-substituted 4,4'-diaminodiphenylmethanes are those of the formula

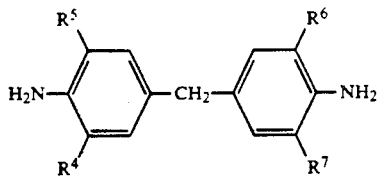

where $R^4$, $R^5$, $R^6$ and $R^7$ are identical or different methyl, ethyl, propyl, isopropyl, sec.-butyl or tert.-butyl, but where one or more of the radicals must be isopropyl or sec.-butyl. The 4,4'-diaminodiphenylmethanes can also be used mixed with isomers of the formulae

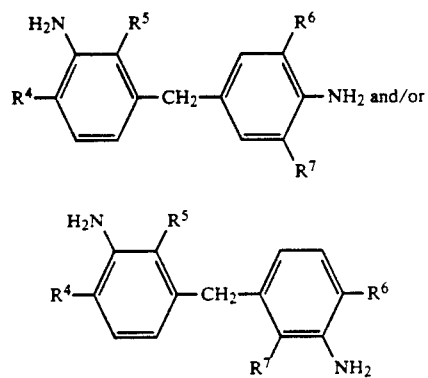

where $R^4$, $R^5$, $R^6$ and $R^7$ are as defined above.

Specific examples are: 3,3',5-trimethyl-5'-isopropyl-, 3,3',5-triethyl-5'-isopropyl, 3,3',5-trimethyl-5'-sec.-butyl-and 3,3',5-triethyl-5'-sec.-butyl-4,4'-diaminodiphenylmethane, 3,3'-dimethyl-5,5'-diisopropyl-, 3,3'-diethyl-5,5'-diisopropyl-, 3,3'-dimethyl-5,5'-di-sec.-butyl-, 3,3'-diethyl-5,5'-di-sec.-butyl-, 3,5-dimethyl-3',5'-diisopropyl-, 3,5-diethyl-3',5'-diisopropyl-, 3,5'-dimethyl-3',5'-di-sec.-butyl-and 3,5-diethyl-3',5'-di-sec.-butyl-4,4'-diaminodiphenylmethane, 3-methyl-3',5,5'-triisopropyl-, 3-ethyl-3',5,5'-triisopropyl-, 3-methyl-3'-ethyl-5,5'-diisopropyl-, 3-methyl-3',5,5'-tri-sec.-butyl-and 3-ethyl-3',5,5'-tri-sec.-butyl-4,4'-diaminodiphenylmethane, 3,3'-diisopropyl-5,5'-di-sec.-butyl-, 3,5-diisopropyl-3',5'-di-sec.-butyl-, 3-ethyl-5-sec.-butyl-3',5'-diisopropyl-, 3-methyl-5-tert.-butyl-3',5'-diisopropyl-, 3-ethyl-5-sec.-butyl-3'-methyl-5'-tert.-butyl-, 3,3',5,5'-tetraisopropyl-and 3,3',5,5'-tetra-sec.-butyl-4,4'-diaminodiphenylmethane. Preference is given to 3,5-dimethyl-3',5'-diisopropyl-and 3,3',5,5'-tetraisopropyl-4,4'-diaminodiphenylmethane. The diaminodiphenylmethanes can be employed individually or in the form of mixtures.

To prepare the elastomers containing N-substituted urea and amide groups in bound form and to produce moldings is therefrom, the industrially readily accessible 1,3,5-triethyl-2,4-phenylenediamine, 1-methyl-3,5-diethyl-2,4-phenylenediamine, mixtures of 1-methyl-3,5-diethyl-2,4- and -2,6-phenylenediamines, so-called DETDA, isomer mixtures of 3,3'-di- or 3,3',5,5'-tetraalkyl-substituted 4,4'-diaminodiphenylmethanes having from 1 to 4 carbon atoms in the alkyl, in particular 3,3',5,5'-tetraalkyl-substituted 4,4'-diaminodiphenylmethanes containing methyl, ethyl and isopropyl in a bound form, and mixtures of said tetraalkyl-substituted 4,4'-diaminodiphenylmethanes and DETDA are preferably used.

To prepare the elastomers according to the invention, the organic polyisocyanates and/or modified polyisocyanate mixtures (a), polyazomethine-containing polyoxyalkylene-polyamine mixtures (b) and alkyl-substituted primary aromatic polyamines (c) are reacted in such amounts that the equivalent ratio between the NCO groups of component (a) and the sum of the reactive hydrogen atoms of components (b) and (c) is from 0.85 to 1.25:1, preferably from 0.95 to 1.15:1 and in particular from 0.98 to 1.10:1, and the ratio between the sum of the aldimine and/or ketimine groups, secondary amino groups and, if present, primary amino groups of component (b) and the primary aromatic amino groups of component (c) is from 90:10 to 10:90, preferably from 40:60 to 15:85.

(d) The elastomers according to the invention containing N-substituted urea and amide groups in bound form are preferably prepared in the absence of catalysts. However, if catalysts are used, they are, in particular, highly basic amines, the absence of synergistic organometallic compounds, for example organotin compounds, being absolutely necessary to produce heat-resistant moldings which can be subjected to on-line painting. Specific examples of suitable catalysts are amidines, e.g. 2,3-dimethyl-3,4,5,6-tetrahydropyrimidine, and tertiary amines, e.g. triethylamine, tributylamine, N,N-dimethylbenzylamine, N-methyl-, N-ethyl-, N-cyclohexylmorpholine, N,N,N',N'-tetramethylethylenediamine, N,N,N',N'-tetramethylbutanediamine, N,N,N',N'-tetramethylhexamethylenediamine, N,N,N',N'',N''-pentamethyldiethylenetriamine, N,N,N',N'-tetramethyldiaminoethyl ether, bis(dimethylaminopropyl)urea, dimethylpiperazine, 1,2-dimethylimidazole, 1-azabicyclo[3.3.0]octane and preferably 1,4-diazabicyclo[2.2.2.]octane.

Other suitable catalysts are tris(dialkylaminoalkyl)-s-hexahydrotriazines, in particular tris(N,N-dimethylaminopropyl)-s-hexahydrotriazine, tetraalkylammonium hydroxides, e.g. tetramethylammonium hydroxide, alkali metal hydroxides, e.g. sodium hydroxide, and alkali metal alcoholates, e.g. sodium methylate and potassium isopropylate, and the alkali metal salts of long-chain fatty acids having from 10 to 20 carbon atoms, with or without internal OH side groups. From 0.001 to 5k % by weight, preferably from 0.05 to 2% by weight, of catalyst, based on the weight of component (b), are usually used.

To produce elastic moldings based on elastomers according to the invention containing N-substituted urea and amide groups in bound form, blowing agents (e) may be introduced into the reaction mixture of components (a) to (c) and, if desired, (d) in order to achieve cellular moldings, as can, if desired, auxiliaries (f) and/or additives (g).

(e) An example of a suitable blowing agent for the production of cellular moldings is water, which reacts with isocyanate groups to form carbon dioxide. The water can be employed here in pure form or in chemically or physically bound form, for example in the form of tert.-butanol, as water crystallization or bound to zeolites, with the proviso that the water is liberated under the reaction conditions for formation of the elastomers. The amount of water which can expediently be used is from 0.1 to 1.0% by weight, preferably from 0.2 to 0.4% by weight, based on the weight of components (b) and (c).

Other blowing agents which can be used are low-boiling liquids which evaporate during the exothermic polyaddition reaction. Suitable liquids are those which are inert toward the organic polyisocyanate and have a boiling point of less than 100° C. Examples of preferred liquids of this type are halogenated hydrocarbons, such as methylene chloride, trichlorofluoromethane, dichlorodifluoromethane, dichloromonofluoromethane, dichlorotetrafluoroethane, 1,1,2-trichloro-1,2,2-trifluoroethane, trifluoromethane, difluoromethane, difluoroethane, tetrafluoroethane and heptafluoropropane, hydrocarbons, such as n- and iso-butane, n- and iso-pentane and technical-grade mixtures of these hydrocarbons, propane, propylene, hexane, heptane, cyclobutane, cyclopentane, cyclohexane, dialkyl ethers, such as dimethyl ether, diethyl ether and furan, carboxylic acid esters, such as methyl formate and ethyl formate, and acetone. Mixtures of these low-boiling liquids with one another and/or with other substituted or unsubstituted hydrocarbons can also be used.

The most expedient amount of low-boiling liquid for the production of cellular moldings from elastomers containing N-substituted urea and amide groups depends on the desired density and, where appropriate, on the presence of water. In general, amounts of from 1 to 15% by weight, preferably from 2 to 11% by weight, based on the weight of components (b) and (c) give satisfactory results.

(f) and (g): specific examples of suitable auxiliaries (f) and/or additives (g) are surface-active substances, foam stabilizers, cell regulators, fillers, reinforcing agents, flameproofing agents, external and/or internal release agents, dyes, pigments, hydrolysis-protection agents, and fungistatic and bacteriostatic substances.

Suitable surface-active substances are compounds which are used to support homogenization of the starting materials and, if appropriate, are also suitable for regulating cell structure. Specific examples are emulsifiers, such as the sodium salts of castor oil sulfates or of fatty acids, and salts of fatty acids with amines, e.g. diethylamine oleate, diethanolamine stearate and diethanolamine ricinoleate, salts of sulfonic acids, e.g. alkali metal or ammonium salts of dodecylbenzene- or dinaphthylmethanedisulfonic acid and ricinoleic acid; foam stabilizers, such as siloxane-oxalkylene copolymers and other organopolysiloxanes, oxethylated alkylphenols, oxethylated fatty alcohols, paraffin oils, castor oil esters, ricinoleic acid esters, turkey red oil and groundnut oil, and cell regulators, such as paraffins, fatty alcohols and dimethylpolysiloxanes. The surface-active substances are usually used in amounts of from 0.01 to 5 parts by weight, based on 100 parts by weight of components (b) and (c).

For the purposes of the invention, fillers, in particular reinforcing fillers, are conventional organic and inorganic fillers, reinforcing agents, weighting agents, agents for improving the abrasion behavior in paints, coating agents, etc. Specific examples are inorganic fillers, such as silicate minerals, for example phyllosilicates, such as antigorite, serpentine, hornblendes, amphiboles, chrysotile, talc and zeolites, metal oxides, such as kaolin, aluminas, titanium oxides and iron oxides, metal salts such as dialk, barytes and inorganic pigments, such as cadmium sulfide and zinc sulfide, and glass, inter alia. Preference is given to kaolin (china clay), aluminum silicate and coprecipitates of barium sulfate and aluminum silicate, and natural and synthetic fibrous minerals, such as wollastonite and, in particular, glass fibers of various lengths, which may be sized. Examples of suitable organic fillers are charcoal, carbon fibers, melamine, collophonium, cyclopentadienyl resins and graft polymers based on styrene-acrylonitrile, which are prepared by in-situ polymerization of acryonitrile-styrene mixtures in polyoxyalkylene-polyols in a similar manner to those given in German Patents 1,111,394, 1,222,669 (U.S. Pat. Nos. 3,304,273, 3,383,351 and 3,523,093), 1,152,536 (GB 1,040,452) and 1,152,537 (GB 987,618) and then aminated, and also filler-polyoxyalkylene-polyamines in which aqueous polymer dispersions are converted into polyoxyalkylene-polyamine dispersions.

The inorganic and organic fillers can be used individually or as mixtures. Preference is given to unsized or sized short glass fibers having lengths of less than 0.4 mm, preferably of less than 0.2 mm.

The inorganic and/or organic fillers and/or reinforcing agents are advantageously incorporated into the reaction mixture in amounts of from 0.5 to 35% by weight, preferably from 3 to 20% by weight, based on the weight of components (a) to (c).

Examples of suitable flameproofing agents are tricresyl phosphate, tris-2-chloroethyl phosphate, tris-chloropropyl phosphate and tris-2,3-dibromopropyl phosphate.

In addition to the abovementioned halo-substituted phosphates, it is also possible to use inorganic flameproofing agents, e.g. aluminum oxide hydrate, antimony trioxide, arsenic oxide, ammonium polyphosphate and calcium sulfate, or melamine or mixtures thereof for flameproofing the moldings. In general, is has proved expedient to use from 5 to 50 parts by weight, preferably from 5 to 25 parts by weight, of the flameproofing agents mentioned per 100 parts by weight of components (b) and (c).

Further details on the other conventional auxiliaries and additives mentioned above can be obtained from the literature, for example from the monograph by J. H. Saunders and K. C. Frisch, High Polymers, Volume XVI, Polyurethanes, Parts 1 and 2, Interscience Publishers, 1962 and 1964 respectively, or Kunststoff-Handbuch, Polyurethane, Volume VII, Hanser-Verlag, Munich, Vienna, 1st and 2nd Editions, 1966 and 1983.

The elastic, compact moldings based on the elastomers according to the invention containing N-substituted urea and amide groups are expediently produced by the one-shot process using the low-pressure method or in particular by reaction injection molding (RIM) in open or preferably closed molds. Cellular moldings are produced by carrying out the reaction, in particular, with compaction in a closed mold. Reaction injection molding is described, for example, by H. Piechota and H. Röhr in Integralschaumstoffe, Carl Hanser-Verlag, Munich, Vienna, 1975; D. J. Prepelka and J. L. Wharton in Journal of Cellular Plastics, March/April 1975, pages 87 to 98, and U. Knipp in Journal of Cellular Plastics, March/April 1973, pages 76–84.

When a mixing chamber having several feed nozzles is used, the starting components can be fed in individually and mixed vigorously in the mixing chamber. It has proven particularly advantageous to use the two-component method, combining synthesis components (b) and (c) and, if desired, (d) to (g) in component (A) and using, as component (B), organic polyisocyanates or modified polyisocyanate mixtures.

It is advantageous here, for example, that components (A) and (B) can be stored separately and transported using a minimum of space and that only the appropriate amounts need be mixed during processing.

The amount of reaction mixture introduced into the mold is such that the moldings obtained, which may be cellular, have a density of from 250 to 1400 kg/m$^3$, the compact moldings preferably having a density of from 1000 to 1400 kg/m$^3$, in particular from 1000 to 1200 kg/m$^3$, and the cellular and microcellular moldings preferably having a density of from 400 to 1100 kg/m$^3$, for example from 450 to 750 kg/m$^3$, in particular from 550 to 650 kg/m$^3$, for shoe soles, and from 700 to 1200 kg/m$^3$, in particular from 950 to 1150 kg/m$^3$, for paneling elements. The starting components are introduced into the mold at from 15° to 80° C., preferably from 30° to 65° C. The mold temperature is expediently from 20° to 110° C., preferably from 35° to 95° C. and in particular from 35° to 75° C. The degree of compaction for the production of microcellular or cellular moldings is from 1.1 to 8, preferably from 2 to 6.

Although the elastomer moldings produced according to the invention are easy to demold, it may be advantageous, in order to improve demolding, to coat the internal surfaces of the mold, at least at the beginning of the production run, with conventional external mold-release agents, for example based on wax or silicone. However, internal mold-release agents, as described, for example, in EP-A-153,639, EP-A-180,749 (AU 85/47,498), EP-A-173,888 (U.S. Pat. No. 4,519,965), WO 84/03,288 (EP-A-119,471) and WO 86/01,215, have proven particularly successful and are therefore preferred. The mold residence times are on average from 3 to 60 seconds, depending on the size and geometry of the molding.

The elastomers according to the invention containing N-substituted urea and amino groups preferably contain no urethane groups in bound form, since the latter usually impair the heat distortion resistance. The products are distinguished by good mechanical properties and have a green density, measured in accordance with DIN 53 420, of from 800 to 1400 kg/m$^3$, a tear strength, measured in accordance with DIN 53 504, of from 15 to 55 N/mm$^2$, preferably from 20 to 45 N/mm$^2$, an elongation at break, measured in accordance with DIN 53 504 of from 20 to 400%, preferably 50 to 350%, a tear propagation strength, measured in accordance with DIN 53 515, of from 25 to 140 N/mm$^2$, preferably from 30 to 120 N/mm$^2$, a Shore D hardness measured in accordance with DIN 53 505, of from 20 to 80, preferably from 30 to 77, a modulus of elasticity in bending, measured in accordance with DIN 53 457, of from 200 to 2200, and a heat distortion resistance (HDT), measured in accordance with ISO-75/B (DIN 53 461) of from 80° to 210° C., preferably from 90° to 205° C.

The compact moldings obtainable by the process according to the invention are used, in particular, in the automotive and aircraft industries, for example as fender covers, bump-protection strips, body parts, e.g. drip moldings, wings, spoilers, wheel arch wideners, and for other industrial housings and rollers. The cellular moldings are suitable for shoe soles, armrests, headrests, sun visors, safety paneling in passenger compartments, and as motor cycle, tractor or bicycle saddles, cushions and surface layers in composite articles.

EXAMPLE 1 a) Preparation of N,N'-polyoxypropylenedibenzylimine 6000 parts by weight of a polyoxypropylenediamine of the structure

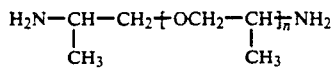

having a mean molecular weight of 2000 (n≈33) were conditioned at 50° C. in a 10 liter three-necked flask, equipped with stirrer, dropping funnel and distillation apparatus.

1300 parts by weight of a solution comprising
650 parts by weight of benzaldehyde and
650 parts by weight of cyclohexane were added dropwise over the course of 1 hours with vigorous stirring, and the mixture was stirred at 50° C. for a further 15 minutes.

The volatile constituents of the reaction mixture were removed at a bottom temperature of up to 100° C., first at atmospheric pressure and subsequently with continuous reduction in the pressure down to from 2 to 3 mbar. The residue obtained was 6500 parts by weight of N,N'-polyoxypropylenedibenzylimine, which was hydrogenated without further purification.

b) Preparation of N,N'-dibenzylpolyoxypropylenediamine 6000 parts by weight of the N,N-polyoxypropylenedibenzylimine prepared as described in Example 1a were hydrogenated in a 10 liter autoclave for 20 hours using hydrogen at 130° C. under a pressure of 200 bar in the presence of 250 parts by weight of Raney nickel which had previously been washed with methanol and cyclohexane. After the autoclave had been decompressed, the reaction mixture was filtered under pressure, and the volatile constituents were subsequently removed at 5 mbar at a maximum bottom temperature of 150° C.

N,N'-Dibenzylpolyoxypropylenediamine was obtained in virtually quantitative yields.

EXAMPLE 2 a) Preparation of N,N',N''-polyoxypropylenetribenzylimine 6000 parts by weight of a polyoxypropylenetriamine having the structure

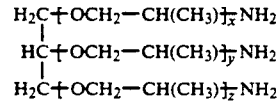

and having a mean molecular weight of 3000 (x+y+z≈50) were reacted by a method similar to that of Example 1a with 1300 parts by weight of a solution comprising
650 parts by weight of freshly distilled benzaldehyde and
650 parts by weight of cyclohexane.

The residue obtained comprised 6800 parts by weight of N,N',N''-polyoxypropylenetribenzylimine, which is hydrogenated without further purification.

b) Preparation of N,N',N"-tribenzylpolyoxypropylenetriamine 6800 parts by weight of the N,N',N"-polyoxypropylenetribenzylimine prepared in Example 2a were hydrogenated by a method similar to that of Example 1b.

N,N',N"-Tribenzylpolyoxypropylenetriamine was obtained in virtually quantitative yield.

EXAMPLE 3 a) Preparation of N,N'-polyoxypropylenedicyclopentylimine 2500 parts by weight of a polyoxypropylenediamine having the structure

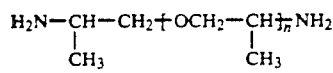

having a mean molecular weight of 2000 ($n \approx 33$) and containing 91% or more of primary amino groups were mixed at room temperature with 881 parts by weight of a solution comprising 231 parts by weight of cyclopentanone and
650 parts by weight of toluene, and the resultant reaction mixture was refluxed on a water separator until water no longer separated off (duration about 9 hours). The toluene and the excess cyclopentanone were then removed by distillation under reduced pressure at from 100° to 120° C.

The residue obtained comprised 2700 parts by weight of N,N'-polyoxypropylenedicyclopentylimine, which was hydrogenated without further purification.

b) Preparation of N,N'-dicyclopentylpolyoxypropylenediamine 2700 parts by weight of the N,N'-polyoxypropylenedicyclopentylimine prepared in Example 3a were hydrogenated for 8 hours at 130° C. at 200 bar using hydrogen in a 10 liter autoclave in the presence of 250 parts by weight of Raney nickel which had previously been washed with tetrahydrofuran.

After the autoclave had been decompressed, the reaction mixture was filtered using a pressure filter, and the volatile constituents were then separated off at a pressure 2 mbar and a maximum bottom temperature of 150° C.

N,N'-Dicyclopentylpolyoxypropylenediamine was obtained in virtually quantitative yield, and was used without further purification for the preparation of the elastomers.

EXAMPLE 4 a) Preparation of N,N'-polyoxypropylenedibutylimine 6000 parts by weight of a polyoxypropylenediamine having a mean molecular weight of 2000 and containing more than 96% of primary amino groups were conditioned at 50° C. in the apparatus described in Example 1a.

1020 parts by weight of a solution comprising
510 parts by weight of butyraldehyde and
510 parts by weight of cyclohexane
were added dropwise over the course of 1 hour with vigorous stirring, and the mixture was stirred at 50° C. for a further 15 minutes.

The volatile constituents of the reaction mixture were then separated off at a bottom temperature of up to 100° C., first at atmospheric pressure and subsequently with a continuous reduction in the pressure down to from 2 to 3 mbar.

The residue obtained comprised 6130 parts by weight of N,N'-polyoxypropylenedibutylimine, which was hydrogenated without further purification.

b) Preparation of N,N'-dibutylpolyoxypropylenediamine

Hydrogenation was carried out by a method similar to that of Example 1b, using 6000 parts by weight of the above-described N,N'-polyoxypropylene-dibutylimine.

N,N'-Dibutylpolyoxypropylenediamine was obtained in virtually quantitative yield.

Preparation of elastomers containing N-benzylurea and amide groups

EXAMPLE 5

A Component

Mixture of
15 parts by weight of N,N'-polyoxypropylenedicyclopentylimine, prepared as indicated in Example 3a,
25.5 parts by weight of polyoxypropylenediamine having a means molecular weight of 2000 and containing 91% of primary amino groups,
26.5 parts by weight of N,N'-dibenzylpolyoxypropylenediamine, prepared as indicated in Examples 1a and 1b,
29.0 parts by weight of a mixture of 1-methyl-3,5-diethylphenylene-2,4-diamine and 1-methyl-3,5-diethylphenylene-2,6-diamine in a weight ratio 80:20, abbreviated to DETDA in the Examples below,
2.0 parts by weight of zinc stearate and
2.0 parts by weight of N,N'-polyoxypropylenedicyclohexylimine, prepared by reacting a polyoxypropylenediamine having a mean molecular weight of 230 and containing more than 91% of primary amino groups, with cyclohexanone.

B Component 4,4'-Diphenylmethane diisocyanate-based polyisocyanate mixture modified with carbodiimide groups and having an NCO content of 20.0% by weight.

Components A and B were mixed in the mixing ratio 100:94.7 parts by weight in a Puromat ® 30 high-pressure metering unit from Elastogran Polyurethane GmbH, Machine Construction Business Area, and injected into a metallic mold at 65° C. with internal dimensions 400×200×4 mm. The temperature of the A component was 65° C. and that of the B component was 50° C.

The flow path of the reaction mixture, at a mold temperature of 65° C., was 172 cm, measured using an S-shaped flow channel having a diameter of 10 mm and the abovementioned high-pressure feed unit with an output of 300 g/sec at a shot time of 1 second. The initial Shore D hardness measured 40 seconds after the mold was opened, was 48.

The following mechanical data were measured on the molding conditioned at 160° C. for one hour:

| | | |
|---|---|---|
| Green density | DIN 53 420 [kg/m³] | 1139 |
| Tear strength | DIN 53 504 [N/mm²] | 33 |
| Elongation at break | DIN 53 504 [%] | 144 |
| Tear propagation strength | DIN 53 515 [N/mm²] | 31 |

| Hardness | DIN 53 505 [Shore D] | 73 |
| Modulus of elasticity | DIN 53 457 [N/mm²] | 685 |
| Heat distortion resistance (HDT) in accordance with ISO-75/B | DIN 53 461 [°C.] | 153 |

EXAMPLE 6

A Component

Mixture of 15 parts by weight of N,N'-polyoxypropylenedicyclopentylimine, prepared as indicated in Example 3a, 52.0 parts by weight of N,N'-dibenzylpolyoxypropylenediamine, prepared as indicated in Examples 1a and 1b, 29.0 parts by weight of DETDA, 2.0 parts by weight of zinc stearate and 2.0 parts by weight of N,N'-polyoxypropylenedicyclohexylimine, prepared by reacting a polyoxypropylenediamine having a mean molecular weight of 230 and containing more than 91% of primary amino groups, with cyclohexanone.

B Components: Analogous to Example 5

Components A and B were reacted in the mixing ratio A:B = 100:93.2 parts by weight by a method similar to that of Example 5 to give moldings.

The flow path of the reaction mixture, at a mold temperature of 65° C., was 180 cm, measured by a method similar to that of Example 5.

The initial Shore D hardness, measured 40 seconds after the mold was opened, was 49.

The following mechanical data were measured on the molding conditioned at 160° C. for one hour:

| Green density | DIN 53 420 [kg/m³] | 1113 |
| Tear strength | DIN 53 504 [N/mm²] | 32 |
| Elongation at break | DIN 53 504 [%] | 130 |
| Tear propagation strength | DIN 53 515 [N/mm²] | 25 |
| Hardness | DIN 53 505 [Shore D] | 72 |
| Modulus of elasticity | DIN 53 457 [N/mm²] | 703 |
| Heat distortion resistance (HDT) in accordance with ISO-75/B | DIN 53 461 [°C.] | 160 |

EXAMPLE 7

A Component

Mixture of 30.0 parts by weight of N,N'-polyoxypropylenedicyclopentylimine, prepared as indicated in Example 3a, 37.0 parts by weight of N,N'-dibenzylpolyoxypropylenediamine, prepared as indicated in Examples 1a and 1b, 29.0 parts by weight of DETDA, 2.0 parts by weight of zinc stearate and 2.0 parts by weight of N,N'-polyoxypropylenedicyclohexylimine, prepared by reacting a polyoxypropylenediamine having a mean molecular weight of 230 and containing more than 91% of primary amino groups, with cyclohexanone.

B Components: Analogous to Example 5

Components A and B were reacted in the mixing ratio A:B = 100:92.6 parts by weight by a method similar to that of Example 5 to give moldings.

The flow path of the reaction mixture, at a mold temperature of 65° C., was 192 cm, measured by a method similar to that of Example 5.

The initial Shore D hardness, measured 40 seconds after the mold was opened, was 47.

The following mechanical data were measured on the molding conditioned at 160° C. for one hour:

| Green density | DIN 53 420 [Kg/m³] | 1124 |
| Tear strength | DIN 53 504 [N/mm²] | 30 |
| Elongation at break | DIN 53 504 [%] | 103 |
| Tear propagation strength | DIN 53 515 [N/mm²] | 17 |
| Hardness | DIN 53 505 [Shore D] | 72 |
| Modulus of elasticity | DIN 53 457 [N/mm²] | 748 |
| Heat distortion resistance (HDT) in accordance with ISO-75/B | DIN 53 461 [°C.] | −160 |

EXAMPLE 8

A Component

Mixture of 67.0 parts by weight of N,N'-dibenzylpolyoxypropylenediamine, prepared as indicated in Examples 1a and 1b, 29.0 parts by weight of DETDA, 2.0 parts by weight of zinc stearate and 2.0 parts by weight of N,N'-polyoxypropylenedicyclohexylimine, prepared by reacting a polyoxypropylenediamine having a mean molecular weight of 230 and containing more than 91% of primary amino groups, with cyclohexanone.

B Component: Analogous to Example 5

Components A and B were reacted in the mixing ratio A:B = 100:93.9 parts by weight by a method similar to that of Example 5 to give moldings.

The flow path of the reaction mixture, at a mold temperature of 65° C., was 195 cm, measured by a method similar to that of Example 5.

The initial Shore D hardness, measured 40 seconds after the mold was opened, was 48.

The following mechanical data were measured on the molding conditioned at 160° C. for one hour:

| Green density | DIN 53 420 [kg/m³] | 1134 |
| Tear strength | DIN 53 504 [N/mm²] | 30 |
| Elongation at break | DIN 53 504 [%] | 124 |
| Tear propagation strength | DIN 53 515 [N/mm²] | 26 |
| Hardness | DIN 53 505 [Shore D] | 71 |
| Modulus of elasticity | DIN 53 457 [N/mm²] | 659 |
| Heat distortion resistance (HDT) in accordance with ISO-75/B | DIN 53 461 [°C.] | 162 |

COMPARISON EXAMPLE I

A Component

Mixture of 15 parts by weight of N,N'-polyoxypropylenedicyclopentylimine, prepared as indicated in Example 3a, 52.0 parts by weight of polyoxypropylenediamine having a mean molecular weight of 2000 and containing 91% or more of primary amino groups, 29.0 parts by weight of DETDA, 2.0 parts by weight of zinc stearate and 2.0 parts by weight of N,N'-polyoxypropylenedicyclohexylimine, prepared by reacting a polyoxypropylenediamine having a mean molecular weight of 230 and containing more than 91% of primary amino groups, with cyclohexanone.

B Component: Analogous to Example 5

Components A and B were reacted in the mixing ratio A:B=100:94.7 parts by weight by a method similar to that of Example 5 to give moldings.

The flow path of the reaction mixture, at a mold temperature of 65° C., was 158 cm, measured by a method similar to that of Example 5.

The initial Shore D hardness, measured 40 seconds after the mold was opened, was 51.

The following mechanical data were measured on the molding conditioned at 160° C. for one hour:

| Green density | DIN 53 420 [kg/m³] | 1104 |
| Tear strength | DIN 53 504 [N/mm²] | 30 |
| Elongation at break | DIN 53 504 [%] | 128 |
| Tear propagation strength | DIN 53 515 [N/mm²] | 21 |
| Hardness | DIN 53 505 [Shore D] | 72 |
| Modulus of elasticity | DIN 53 457 [N/mm²] | 706 |
| Heat distortion resistance (HDT) in accordance with ISO-75/B | DIN 53 461 [°C.] | 162 |

COMPARISON EXAMPLE II

A Component

Mixture of 41.1 parts by weight of N,N'-polyoxypropylenedicyclopentylimine, prepared as indicated in Example 3a, 25.5 parts by weight of polyoxypropylenediamine having a mean molecular weight of 2000 and containing 91% or more of primary amino groups, 29.0 parts by weight of DETDA, 2.0 parts by weight of zinc stearate and 2.0 parts by weight of N,N'-polyoxypropylenedicyclohexylimine, prepared by reacting a polyoxypropylenediamine having a mean molecular weight of 230 and containing more than 91% of primary amino groups, with cyclohexanone.

B Component: Analogous to Example 5

Components A and B were reacted in the mixing ratio A:B=100:93.5 parts by weight by a method similar to that of Example 5 to give moldings.

The flow path of the reaction mixture, at a mold temperature of 65° C., was 166 cm, measured by a method similar to that of Example 5.

The initial Shore D hardness, measured 40 seconds after the mold was opened, was 50.

The following mechanical data were measured on the molding conditioned at 160° C. for one hour:

| Green density | DIN 53 420 [kg/m³] | 1104 |
| Tear strength | DIN 53 504 [N/mm²] | 30 |
| Elongation at break | DIN 53 504 [%] | 110 |
| Tear propagation strength | DIN 53 515 [N/mm²] | 17 |
| Hardness | DIN 53 505 [Shore D] | 73 |
| Modulus of elasticity | DIN 53 457 [N/mm²] | 724 |
| Heat distortion resistance (HDT) in accordance with ISO-75/B | DIN 53 461 [°C.] | 160 |

We claim:

1. A process for the production of elastic moldings based on elastomers containing N-substituted urea and amide groups in bound form, by reacting
   a) one or more organic and/or modified organic polyisocyanates with
   b) a polyazomethine-containing polyoxyalkylene-polyamine mixture and
   c) one or more alkyl-substituted aromatic polyamines having a molecular weight of up to 500,
in the presence or absence of
   d) catalysts,
wherein the polyazomethine-containing polyoxyalkylene-polyamine mixture (b) contains:
   bi) one or more polyazomethine,
   bii) one or more polyoxyalkylene-polyamine containing terminal secondary amino groups, and, if desired,
   biii) one or more polyoxyalkylene-polyamine containing terminal primary amino groups.

2. A process as claimed in claim 1, wherein the polyazomethine (bi) is prepared by reacting a polyoxyalkylene-polyamine containing from 2 to 4 primary amino groups and having a mean molecular weight of from 1100 to 8000 with one or more organic aldehyde and/or, preferably, ketone.

3. A process as claimed in claim 1 or 2, wherein the secondary polyoxyalkylene-polyamine (bii) has a molecular weight of from 1100 to 8000 and contains from 2 to 4 RHN groups bound in the terminal position, where R is
   linear or branched alkyl having from 1 to 12 carbon atoms,
   cycloalkyl having from 4 to 10 carbon atoms,
   benzyl which is substituted on the phenyl by fluorine, chlorine, amino, nitro, carboxyl, alkyl or alkoxy having from 1 to 12 carbon atoms,
   benzyl,
   alkylphenyl having from 1 to 12 carbon atoms in the alkyl and phenyl.

4. A process as claimed in claim 1 or 2, wherein the secondary polyoxyalkylene-polyamine used is an N,N'-dibenzylpolyoxyalkylenediamine, and N,N'N"-tribenzylpolyoxyalkylenetriamine or a mixture of these N-benzyl-substituted polyoxyalkylenediamines or -triamines, the oxyalkylene being selected from the group comprising polyoxypropylene, polyoxytetramethylene, polyoxypropylene-polyoxyethylene, polyoxytetramethylene-polyoxyethylene and/or polyoxypropylene.

5. A process as claimed in claim 1 or 2, wherein the polyoxyalkylene-polyamine (biii) contains from 2 to 4 primary amino groups and has a molecular weight of from 1100 to 8000.

6. A process as claimed in claim 1 or 2, wherein the ratio between the aldimine and/or ketimine groups and secondary amino groups in the polyazomethine-containing polyoxyalkylene-polyamine mixture (b) is less than 1.

7. A process as claimed in claim 1 or 2, wherein the polyazomethine-containing polyoxyalkylene-polyamine mixture (b) contains:
from 9 to 49% of aldimine and/or ketimine groups
from 20 to 91% of terminal secondary amino groups and
from 0 to 71% of terminal primary amino groups,
where the percentages are based on the total number of aldimine groups, ketimine groups, terminal secondary and terminal primary amino groups in the polyoxyalkylene-polyamine mixture (b), and (bi) to (biii) each have a mean molecular weight of from 2000 to 3000.

8. A process as claimed in claim 1 or 2, wherein the polyoxyalkylene-polyamine mixture (b) contains, based on 100 parts by weight of (b):
from 6 to 59 parts by weight of one or more polyazomethine (bi),
from 11 to 94 parts by weight of one or more polyoxyalkylene-polyamine (bii) containing terminal secondary amino groups and
from 0 to 79 parts by weight of one or more polyoxyalkylene-polyamine (biii) containing terminal primary amino groups,
where (bi) to (biii) each have a mean molecular weight of from 2000 to 3000.

9. A process as claimed in claim 1 or 2, wherein the elastic, compact moldings are produced by the one-shot process using the RIM method in a closed mold.

10. A process for the production of elastic cellular moldings as claimed in claim 1 or 2, wherein the reaction is carried out in the presence of
e) blowing agents
using the RIM method and with compaction in a closed mold.

11. A process as claimed in claim 1 or 2, wherein the production of the elastic, compact or cellular moldings based on elastomers containing N-substituted urea and amide groups in bound form is carried out in the additional presence of
f) auxiliaries and/or
g) additives.

12. A process as claimed in claim 1 or 2, wherein the modified organic polyisocyanate (a) used is a polyisocyanate mixture having an NCO content of from 8 to 33.6% by weight which contains:
ai) a carbodiimide- and/or urethane-containing polyisocyanate made from 4,4'-diphenylmethane diisocyanate or a mixture of 4,4'- and 2,4'-diphenylmethane diisocyanates and having an NCO content of from 8 to 33.6% by weight, and/or
aii) an NCO-containing prepolymer having an NCO content of from 8 to 25% by weight, based on the weight of the prepolymer, and prepared by reacting a polyoxyalkylene-polyol having a functionality of from 2 to 4 and a molecular weight of from 600 to 6000 with 4,4'-diphenylmethane diisocyanate or a mixture of 4,4'- and 2,4'-diphenylmethane diisocyanates.

13. A process as claimed in claim 1 or 2, wherein the alkyl-substituted aromatic polyamine (c) used is an aromatic diamine which contains one or more alkyl substituent in bound form in the ortho-position to each amino group and is selected from the group comprising 1,3,5-triethyl-2,4-phenylenediamine, 1-methyl-3,5-diethyl-2,4-and/or -2,6-phenylenediamine, 3,3'-dialkyl-4,4'-diaminodiphenylmethanes having from 1 to 4 carbon atoms in the alkyl, and 3,3',5,5'-tetraalkyl-4,4'-diaminodiphenylmethanes having from 1 to 4 carbon atoms in the alkyl, or mixtures of two or more of the alkyl-substituted aromatic diamines mentioned.

14. A process as claimed in claim 1 or 2, wherein the polyazomethine-containing polyoxyalkylene-polyamine mixture (b) and the alkyl-substituted aromatic polyamine (c) are used in such an amount that the ratio between the aldimine and/or ketimine and secondary amino groups or between the aldimine and/or ketimine groups and secondary and primary amino groups of synthesis component (d) and the primary aromatic amino groups of synthesis component (c) is from 90:10 to 10:90.

15. A polyazomethine-containing polyoxyalkylene-polyamine mixture (b) comprising, based on 100 parts by weight of (b),
from 6 to 59 parts by weight of one or more polyazomethine (bi),
from 11 to 94 parts by weight of one or more polyoxyalkylene-polyamine (bii) containing terminal secondary amino groups and
from 0 to 79 parts by weight of one or more polyoxyalkylene-polyamine (biii) containing terminal primary amino groups,
where (bi) to (biii) each have a mean molecular weight of from 2000 to 3000,
and containing, with the percentages based on the total number of aldimine and/or ketimine groups and terminal secondary and primary amino groups in the polyoxyalkylene-polyamine mixture (b),
from 9 to 49% of aldimine and/or ketimine groups,
from 20 to 91% of terminal secondary amino groups and
from 0 to 71% of terminal primary amino groups.

16. A polyazomethine-containing polyoxyalkylene-polyamine mixture (b) as claimed in claim 15, which contains, as polyazomethine (bi), a polyketimine prepared by reacting a polyoxyalkylene-polyamine having a functionality of from 2 to 4 and a molecular weight of from 180 to 8000, selected from the group comprising polyoxyethylene-polyamines, polyoxypropylene-polyamines, polyoxytetramethylene-polyamines and polyoxypropylene-polyoxyethylene-polyamines with an aliphatic and/or cycloaliphatic ketone selected from the group comprising methyl isobutyl ketone, methylcyclohexanone and preferably cyclohexanone and cyclopentanone.

17. A polyazomethine-containing polyoxyalkylene-polyamine mixture (b) as claimed in claim 15 or 16, wherein the secondary polyoxyalkylene-polyamine is an N,N'-dibenzylpolyoxyalkylenediamine, an N,N',N''-tribenzylpolyoxyalkylenetriamine or a mixture of these N-benzyl-substituted polyoxyalkylene-diamines and -triamines, where the oxyalkylene radicals are selected from the group comprising polyoxypropylene, polyoxytetramethylene, polyoxypropylene-polyoxyethylene, polyoxytetramethylene-polyoxyethylene and/or -polyoxypropylene.

18. An elastic, compact or cellular elastomer containing N-substituted urea groups and amide groups in bound form and prepared by reacting
a) one or more organic and/or modified organic polyisocyanate with
b) a polyazomethine-containing polyoxyalkylene-polyamine mixture which contains:
bi) one or more polyaldimine and/or polyketimine,
bii) one or more polyoxyalkylene-polyamine containing terminal secondary amino groups, and, if desired, biii) one or more polyoxyalkylene-polyamine containing terminal primary amino groups, and c) one or more alkyl-substituted aromatic polyamine having a molecular weight of up to 500, in the presence or absence of d) catalysts and, if appropriate, e) blowing agents, f) auxiliaries and/or g) additives, with the proviso that the ratio between the aldimine and/or ketimine groups and the secondary amino groups (b) is less than 1.

* * * * *